(12) United States Patent
Haynes

(10) Patent No.: US 8,083,260 B2
(45) Date of Patent: Dec. 27, 2011

(54) COMBINATION TRUNK COVER WITH SPOILER AND SCROLLING DISPLAY

(76) Inventor: Riccardo V. Haynes, Medina, OH (US)

(*) Notice: Subject to any disclaimer, the term of this patent is extended or adjusted under 35 U.S.C. 154(b) by 253 days.

(21) Appl. No.: 12/420,129

(22) Filed: Apr. 8, 2009

(65) Prior Publication Data

US 2010/0019479 A1 Jan. 28, 2010

Related U.S. Application Data

(60) Provisional application No. 61/082,875, filed on Jul. 23, 2008.

(51) Int. Cl.
*B60J 11/00* (2006.01)
(52) U.S. Cl. .......................................... 280/770; 40/591
(58) Field of Classification Search .................. 280/770, 280/762, 769; 40/591, 452
See application file for complete search history.

(56) References Cited

U.S. PATENT DOCUMENTS

| | | | | |
|---|---|---|---|---|
| 2,301,834 A * | 11/1942 | Whaley | | 40/591 |
| 3,430,376 A * | 3/1969 | Fritz et al. | | 40/209 |
| 3,594,938 A * | 7/1971 | Mosch | | 40/591 |
| 3,763,908 A | 10/1973 | Norman | | |
| 4,208,820 A * | 6/1980 | Cole | | 40/591 |
| 4,219,218 A | 8/1980 | Waldon | | |
| 4,376,546 A | 3/1983 | Guccione et al. | | |
| 4,574,269 A * | 3/1986 | Miller | | 362/503 |
| 4,607,444 A * | 8/1986 | Foster | | 40/550 |
| 4,925,234 A | 5/1990 | Park et al. | | |
| 4,958,881 A * | 9/1990 | Piros | | 296/98 |
| 4,966,406 A * | 10/1990 | Karasik et al. | | 296/98 |
| 5,016,145 A | 5/1991 | Singleton | | |
| 5,076,196 A * | 12/1991 | Chan | | 116/28 R |
| 5,129,678 A * | 7/1992 | Gurbacki | | 280/770 |
| 5,158,324 A | 10/1992 | Flesher | | |
| 5,398,437 A * | 3/1995 | Bump et al. | | 40/582 |
| 5,424,924 A * | 6/1995 | Ewing et al. | | 362/545 |
| 5,533,287 A * | 7/1996 | Cole | | 40/591 |
| 6,056,425 A | 5/2000 | Appelberg | | |
| 6,371,547 B1 | 4/2002 | Halbrook | | |
| 7,063,375 B2 | 6/2006 | Dringenberg et al. | | |
| 7,095,334 B2 | 8/2006 | Pederson | | |
| 7,154,383 B2 | 12/2006 | Berquist | | |
| 7,175,229 B2 | 2/2007 | Garcia | | |
| 7,213,870 B1 | 5/2007 | Williams | | |
| 7,233,849 B2 | 6/2007 | Hill et al. | | |
| 7,347,017 B2 * | 3/2008 | Shaffer, Jr. | | 40/591 |
| D570,238 S * | 6/2008 | Pickett, Jr. | | D10/109 |
| 7,464,982 B1 * | 12/2008 | Lin et al. | | 296/136.01 |
| 2007/0118423 A1 * | 5/2007 | Always | | 705/14 |

* cited by examiner

*Primary Examiner* — Faye M. Fleming
(74) *Attorney, Agent, or Firm* — Howard M. Cohn

(57) ABSTRACT

A trunk lid cover in combination with a car spoiler. The trunk lid cover is of flexible material and is disposed for covering the trunk lid only of an automobile. The trunk lid cover is held tightly against the surface of said trunk lid. A car spoiler attached to the trunk lid cover. A message display is mounted to the trunk lid cover or to the car spoiler.

18 Claims, 3 Drawing Sheets

COMBINATION TRUNK COVER WITH SPOILER AND SCROLLING DISPLAY

CROSS-REFERENCE TO RELATED APPLICATIONS

This application claims the benefit of U.S. Provisional Patent Application No. 61/082,875 filed on Jul. 23, 2008, which is incorporated herein by reference.

TECHNICAL FIELD OF THE INVENTION

The present invention relates generally to a trunk cover specifically designed to protect the trunk of an automobile, and more particularly to a trunk cover with a detachable spoiler and scrolling display.

BACKGROUND OF THE INVENTION

Automobile hood covers known as "bras" are a common automobile accessory. The expensive finish on cars is very vulnerable to damage by the elements and foreign objects when driving, particularly at higher speeds. Hood cover "bras" protect the hood and front of the vehicle from damages, from bugs, stones and other debris, as well as, hide paint chips, scratches, and dings. These covers are also used to protect a parked car's finish from deterioration caused by harsh sunlight, dust, snow, rain, tree sap, bird droppings and the like. Hood covers and bras can also enhance the aesthetic appearance of the vehicle.

There is a considerable amount art relating to general protective coverings for cars. U.S. Pat. No. 3,763,908 is an example of a protective covering for parked automobiles that covers the automobile upper surfaces, together with extendible flaps which cover the sides of the automobile. The covering is mounted so as to permit air space between the covering and the top and sides of the automobile, and fastens to the automobile body by means of magnetic strips fastened to the covering, and to straps fastened to the covering. This is distinguishable from the present invention because the covering covers the entire car as opposed to just a part of the car, and doesn't suggest incorporating other structures as with the present invention.

U.S. Pat. No. 4,219,218 discloses a halter type protective cover that is constructed to fit snugly over the front part of the hood and front fenders of a car to protect the finish from dirt, bug stains, road grime, tar, flying particles, stones and similar damaging materials. It is constructed to fasten to the vents in the top of the hood and by means of novel spring clamps to the edges of the front fenders and bumper and is especially adapted for sports and imported cars. This invention is distinguishable because it only covers the front part of the hood, as compared to the present invention which covers the rear part of the car and incorporates other structures.

U.S. Pat. No. 4,376,546 discloses a front end shield provided for a car which is rigid and has a peripheral soft resilient tube mounted around the underside to space the planar part of the shield from the surface of the vehicle, there being a pair of headlight covers attached to the retractable headlight mechanisms to complete front end coverage, the shield being made either as a single piece or in two halves to permit easy storage. This invention is distinguishable from the present invention which covers the rear part of the car and incorporates other structures.

U.S. Pat. No. 4,925,234 discloses a length adjustable, trunk stowable protective car cover device is formed from an elongated sheet of flexible weatherproof material having a front end portion releasably connectable to the front end of an automobile, a longitudinally intermediate portion adapted to overlie and shield essentially the entire upper side surface of the automobile, and a rear end portion adapted to extend into the trunk between the rear trunk lid edge and the opposing trunk wall portion which it closes against. This patent is distinguishable from the present invention because it covers the entire car, as opposed to the present invention which covers the rear part of the car and incorporates other structures.

U.S. Pat. No. 5,158,324 discloses a protective cover for vehicles is disclosed, wherein a flexible material having a magnetic base portion with a resilient top portion laminated thereto is cut in segments to conform to a portion of an exterior body surface of a vehicle. More than one segment is placed adjacent to each other in side by side relation to provide a protective cover for a vehicle. The vehicle may be any known type of vehicle, and the protective cover may be cut to cover any portion of the vehicle where protection is desired. This patent is distinguishable from the present invention because the current invention is designed solely for the purpose of covering a rear part of the car and incorporates other structures.

U.S. Pat. No. 6,371,547 discloses a scratch resistor for a vehicle having a front shield and a rear shield. The front shield is carried by a vehicle and covers at least in part a front portion of the vehicle. The rear shield is carried by the vehicle and covers at least in part a rear portion of the vehicle. This patent is distinguishable from the present invention because it is adaptable to cover the entire car, as opposed to the present invention which covers a rear part of the car and incorporates other structures.

U.S. Pat. No. 7,233,849 discloses for example "An automobile communication system is provided for communicating with others by displaying operator selected or input messages on a display mounted in the rear window of a vehicle. The operator may select messages on a keypad or by voice commands received by a microphone mounted in the vehicle. The system may include predetermined messages and may be programmed to include additional messages for display." This patent is distinguishable from the present invention because the display is not provided in locations exterior to the interior of the automobile.

While the majority of the prior art relates to automobile coverings that are utilized to protect the hood of the car exclusively. There exists a need for a covering that protects other portions of the car. The current invention seeks to accomplish this, as well as incorporating other accessories to improve the aesthetic appeal of the automobile.

ASPECTS AND SUMMARY OF THE INVENTION

It is an aspect of the present invention to provide a trunk lid cover with a car spoiler attached thereto.

It is another aspect of the present invention to provide a trunk lid cover with a car spoiler attached thereto and a message display mounted to the trunk lid cover.

It is yet another aspect of the present invention to provide a trunk lid cover with a car spoiler attached thereto and a message display mounted to the car spoiler.

It is still another aspect of the present invention to provide a trunk lid cover with a car spoiler attached thereto and a message display controlled by a key pad disposed within the car.

According to the present invention, there is disclosed a trunk lid cover in combination with a car spoiler comprising:

a trunk lid cover of flexible material disposed for covering the trunk lid only of an automobile; structure for holding the trunk lid cover tightly against the surface of said trunk lid; and a car spoiler attached to the trunk lid cover.

Further according to the present invention, the trunk lid cover is constructed of a fabric materials selected from the group consisting essentially of lightweight polyester, rip-stop nylon material, canvas, flexible plastic material, and leather.

Still further, according to the present invention, the trunk lid cover includes a liner of resilient material positioned on the undersurface of said trunk lid cover disposed for engagement with the surface of said trunk lid.

Yet further according to the present invention, the trunk lid cover has structure for attaching the trunk lid cover to the trunk lid.

Moreover according to the present invention, the structure for attaching the trunk lid cover to the trunk lid includes a plurality of straps extending from opposite edges of the trunk lid cover and disposed beneath the trunk lid.

Also according to the present invention, the structure for attaching the trunk lid cover to the trunk lid includes clamps that are secured to the opposite edges of the trunk lid cover and extend around the edges of the trunk lid so as to extend into the interior of the trunk below trunk lid.

According to the present invention, there is disclosed that the trunk lid cover includes a rectangular-like sleeve section wherein the inward facing side of the sleeve section closest to the trunk lid can be formed of the trunk lid material, mentioned herein before, and the outward facing side of the sleeve section can be of a clear plastic to form a window.

Further according to the present invention, a message display is mounted to the trunk lid cover.

Still further according to the present invention, the message display is disposed within a rectangular-like sleeve section of the trunk lid cover.

Yet further according to the present invention, the message display is a scrolling LED message display.

Moreover according to the present invention, the message display is removably mounted to the outward facing side of the trunk lid cover.

According to the present invention, the message display is powered by power sources from the group including replaceable batteries, solar power and the automobile electrical system.

Further according to the present invention, a message display is mounted to the car spoiler.

Still further according to the present invention, the message display comprises a display and a keypad for generating a message corresponding to an operator selection and transferring said message to said display for output on said display.

Yet further according to the present invention, the keypad includes a plurality of keys, each of said keys corresponding to a message, said keypad selecting the corresponding message in response to depression of one of said keys.

Also according to the present invention, the message display has an array of light emitting diodes for displaying a message, the message can be scrolled across said display, the message can be scrolled across the display a predetermined number of times and after the message has been displayed another message can be automatically displayed.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

DETAILED DESCRIPTION OF THE PREFERRED EMBODIMENTS

Figure 1:
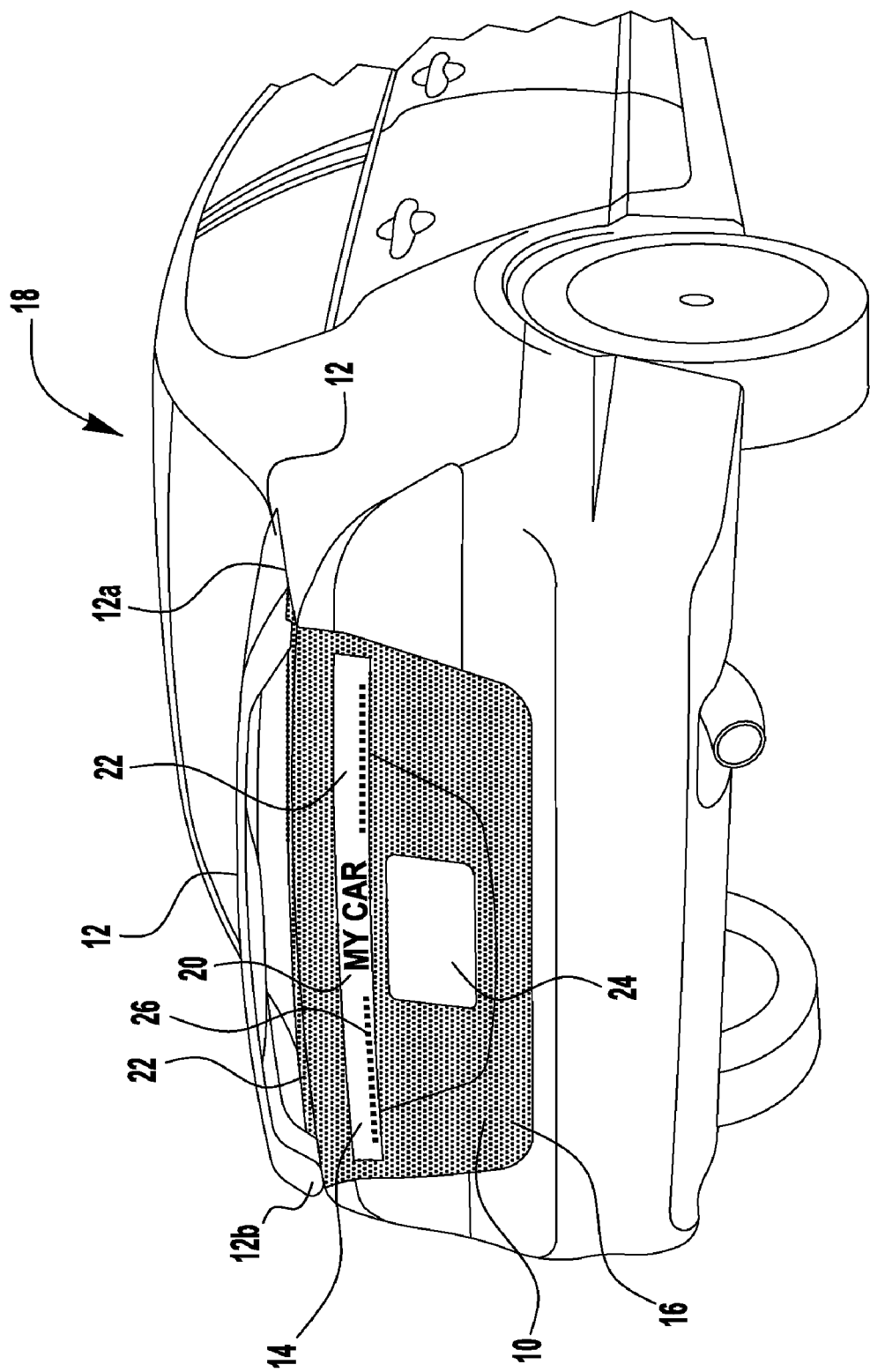
FIG. 1 is a three dimensional, partial view of an automobile with the combination trunk cover with removable spoiler and scrolling LED sign, in accordance with the present invention.

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

Referring to FIG. 1, there is illustrated the present invention including the combination trunk lid cover 10 mounted onto the trunk lid 16 of an automobile 18 in combination with a removable car spoiler 12 and a message display 14. The trunk lid cover 10 is designed to protect the trunk lid 16 of automobile 18 from damages caused by bugs, stones and other debris, as well as hide paint chips, scratches, and dings. Also, the trunk lid cover 10 is used to protect the trunk lid's finish from deterioration caused by harsh sunlight, dust, snow, rain, tree sap, bird droppings and the like.

Trunk lid cover 10 may be constructed of a variety of materials suitable to prevent paint from scratching and therefore should possess the appropriate strength to withstand tearing when exposed to sticks, trees, rocks, brush, and broken glass at ordinary vehicle travel speeds. Suitable fabric materials can comprise a wide variety of materials and include, for instance, lightweight polyester or rip-stop nylon material, canvas, flexible plastic material, leather or any other of a wide range of materials. The fabric is generally, where necessary, provided with interlocking seams and reinforcements at stress points and between different pieces of fabric. Additionally, elasticized seams can be provided in order to ease installation of the trunk lid cover 10 onto the trunk lid 16 of vehicle 18.

The trunk lid cover can include a liner of resilient material positioned on the undersurface of said trunk lid cover disposed for engagement with the surface of said trunk lid.

The trunk lid cover 10 is designed to be removably mounted atop of trunk lid 16 of automobile 18. Trunk lid cover 10 may be attached to the trunk lid 16 in a plethora of ways, such as with straps extending from opposite edges of the trunk lid cover being disposed within the trunk 16. It is within the terms of the invention to mount the trunk lid cover 10 with clamps that are secured to the opposite edges of the trunk lid cover and extend around the edges of the trunk lid so as to extend into the interior of the trunk below trunk lid 16. There may be means such as elastic cords or springs to put tension on the straps or clamps to tightly secure the trunk lid cover 10 to the trunk lid 16.

Trunk lid cover 10 can include a rectangular-like sleeve section 20. The inward facing side of the sleeve section 20, closest to the trunk lid 16, can be formed of the trunk lid material, mentioned herein before, and the outward facing side of the sleeve section 20 can be of a clear plastic to form a window 22. The sleeve section 20 can be located at any desired location on the trunk lid cover 16. For example, as shown in FIG. 1, the sleeve section 20 can be disposed directly above a license plate mounting area 24 of the trunk lid. It is within the terms of the invention to form the sleeve section 20 of any desired shape, construction and size.

The trunk lid cover 10 can, if desired, include an opening or window of clear plastic cover so that a license plate secured to the license plate mounting area 24 is visible when the trunk lid cover is installed on the trunk lid 16.

A message display 14, such as for example, a scrolling LED message display 26 can be mounted to the trunk lid cover 10. In one embodiment, the message display 26, such as for example, a scrolling LED message display can be disposed within the sleeve section 20. The display 26 can be of different shapes and sizes. Display 26 can include an array of LEDs for displaying a message.

It is also within the terms of the invention to removably mount the message display 14 directly to the outward facing side of trunk lid cover 16 by any means such as for example Velcro or a magnetic strip.

In the case of Velcro, one of the hook and loop fasteners can be attached to the back surface of the message display 14 and the other to the trunk lid cover 10.

In the embodiment where a magnetic strip is used to mount the display 14 to the trunk lid cover 10, a flexible magnetic strip can be mounted to the trunk lid cover and, if desired to the back of the display 14 so that the display can be removably and firmly affixed to the trunk lid cover. The magnetic strip can be flexible and can be mounted to the surface of the trunk lid cover or sewn directly into the trunk lid cover.

In another embodiment, the magnetic strip can simply be attached to the back of the display 14 and then magnetically attached to the trunk lid itself.

The message display 14 can be powered by any means such as replaceable batteries, solar power or to a power source within the trunk, such as the automobile electrical system.

Figure 3:
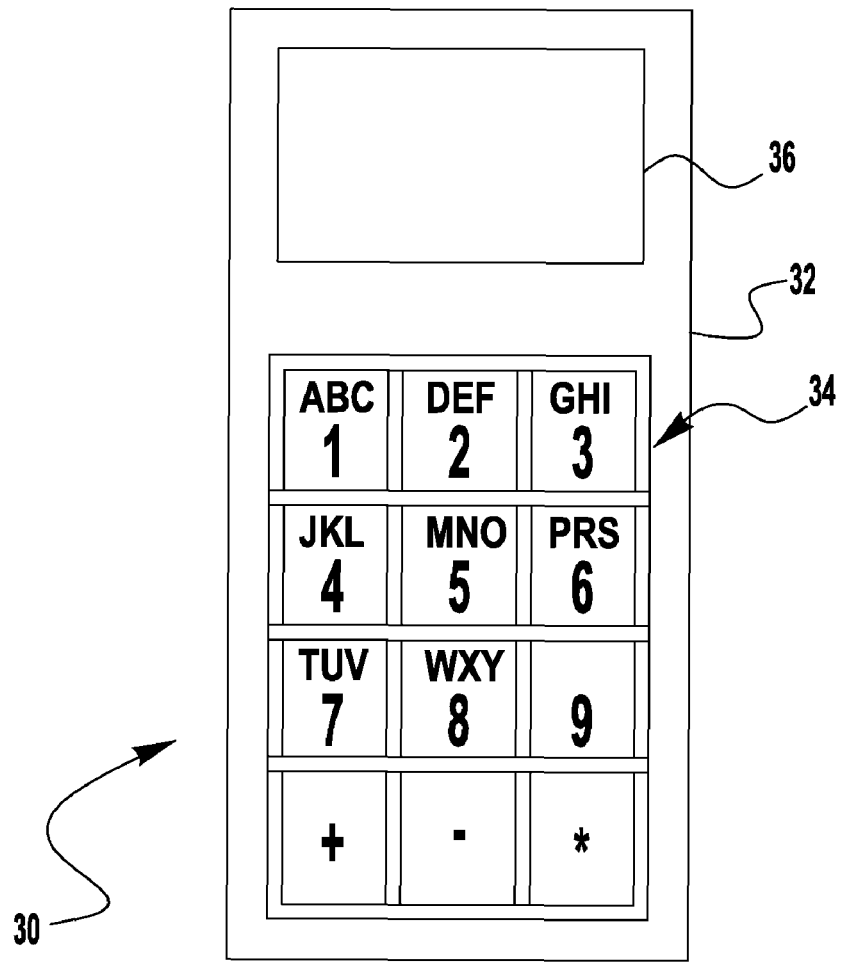
FIG. 3 is a top view of the keypad designed to control a scrolling LED sign, in accordance with the present invention.

A controller 30, such as the keypad 32 shown in FIG. 3, can be used to program the display 14 to display any personalized message to scroll across the display. The keypad 32 is preferably located within automobile 18 whereby the driver of the car may have ready access thereto. It is noted, however, that keypad 32 is not meant to be utilized while the driver is actually in the act of driving car 18. Keys 34 display alphanumeric symbols allow the user to create a personalized message that scrolls across LED sign 26. Screen 36 on the controller 30 allows the user to preview the message that will be scrolling across LED sign 26 on the exterior of the automobile 18.

The plurality of keys 34 on keypad 32 can each correspond to a different message. In that case, the operator can select a desired message in response to depression of one of said keys corresponding to the desired message. The keypad 32 can also cause the message to scroll across the display a predetermined number of times and/or for a predetermined period of time. Alternatively, after a message has been displayed on the sign 36, another message can automatically be displayed.

Figure 2:
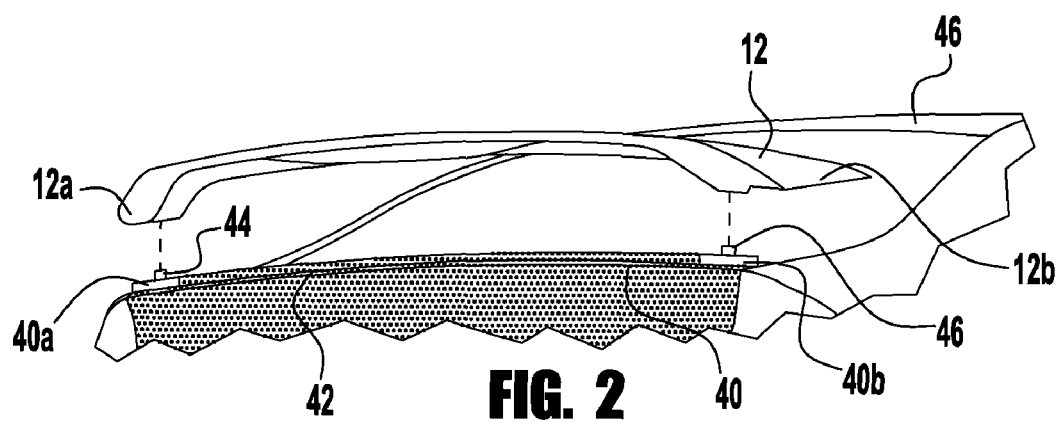
FIG. 2 is a three dimensional view of a removable spoiler for an automobile, in accordance with the present invention.

Referring to FIGS. 1 and 2, the trunk lid cover 10 can include a car spoiler 12. Car spoiler 12 may be constructed of a variety of materials such as plastic, fiberglass, etc. Car spoiler 12 is designed to be both aesthetically pleasing, as well as functional to "spoil" unfavorable air movement across the body of car 18. This results in improved vehicle stability by decreasing lift, which may cause unpredictable handling of car 18 at high speeds. Further, car spoiler 12 can act to increase fuel efficiency of car.

Car spoiler 12 can be attached directly to the trunk lid cover 10. For example, the car spoiler 12 can include an elongated support structure 40 that is shaped to firmly rest on the trunk lid. The support structure 40 can extend the distance between the ends 12a and 12b of the spoiler 12 and is adapted to be received within a pocket 42 formed across the trunk lid cover 46 which is substantially the same as trunk lid cover 16. At each end 40a and 40b of the support structure 40 is a mounting projection 44 and 46, respectively, which can be secured to the ends 12a and 12b of the car spoiler 12. The pocket 42 encases the car spoiler 12 and keeps it firmly disposed on the trunk lid 16 so that the spoiler remains in a desired position in order that it can perform as required.

In accordance with the present invention, the car spoiler 12 can be removably attached to the trunk lid cover 16 by securing the mounting projections 44 and 46 to the ends 12a and 12b of the car spoiler 12 by any suitable means such as Velcro, bolts, adhesive or strong magnets.

In the case of Velcro, one of the hook and loop fasteners can be attached to the outward facing surface of the ends 12a and 12b of the car spoiler 12 and the other fastener can be attached to the trunk lid cover 16.

In an embodiment where a magnetic strip is used to mount the car spoiler 12 to the trunk lid cover 16, a strong magnet can be mounted to the trunk lid cover and another to the ends 12a and 12b of the car spoiler so that the car spoiler can be removably affixed to the trunk lid cover.

Figure 4:
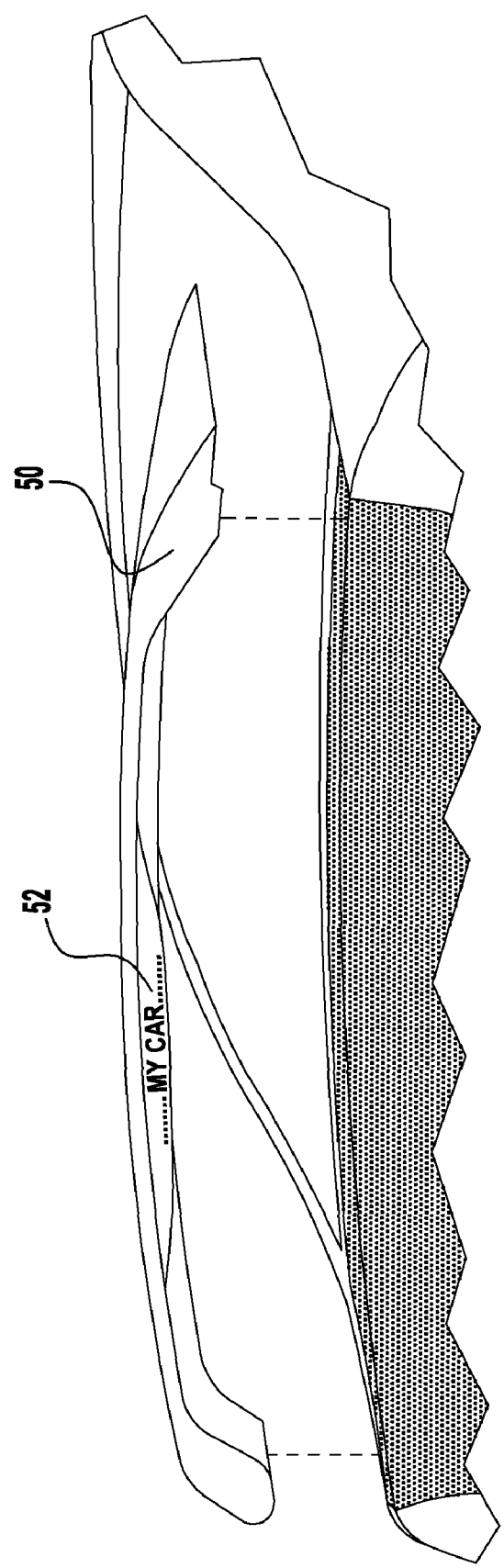
FIG. 4 is a three dimensional, partial view of an automobile with the combination trunk cover with removable spoiler and scrolling LED sign mounted to the spoiler, in accordance with the present invention.

Referring to FIG. 4, there is illustrated another embodiment of the present invention wherein a car spoiler 50 which is removably attached to the trunk lid, as described herein before, includes a message display 52, such as for example a scrolling LED message display, which can be mounted directly to the car spoiler 50. Message display 52 would be substantially the same as message display 26 except for being mounted to the car spoiler. Hereto, the display 52 can include an array of LEDs for displaying a message and the display can be of different shapes and sizes.

It is also understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed. Thus, the scope of the invention should be determined by the appended claims and their legal equivalents, rather than solely by the examples given.

The invention claimed is:

1. A trunk lid cover in combination with a car spoiler comprising:
    a trunk lid cover of flexible material disposed for covering the trunk lid only of an automobile;
    attachment means for holding the trunk lid cover tightly against the surface of said trunk lid;
    a car spoiler attached to the trunk lid cover; and
    wherein trunk lid cover can include a rectangular-like sleeve section wherein the inward facing side of the sleeve section closest to the trunk lid can be formed of the trunk lid cover material, and the outward facing side of the sleeve section is of a clear plastic to form a window.

2. The trunk lid cover in combination with a car spoiler of claim 1 wherein the trunk lid cover is constructed of a fabric materials selected from the group consisting essentially of lightweight polyester, rip-stop nylon material, canvas, flexible plastic material, and leather.

3. The trunk lid cover in combination with a car spoiler of claim 1 wherein the trunk lid cover includes a liner of resilient material positioned on the undersurface of said trunk lid cover disposed for engagement with the surface of said trunk lid.

4. The trunk lid cover in combination with a car spoiler of claim 1 wherein the trunk lid cover has means for attaching the trunk lid cover to the trunk lid.

5. The trunk lid cover in combination with a car spoiler of claim 1 wherein the means for attaching the trunk lid cover to the trunk lid includes a plurality of straps extending from opposite edges of the trunk lid cover and disposed beneath the trunk lid.

6. The trunk lid cover in combination with a car spoiler of claim 1 wherein the means for attaching the trunk lid cover to the trunk lid includes clamps that are secured to the opposite edges of the trunk lid cover and extend around the edges of the trunk lid so as to extend into the interior of the trunk below trunk lid.

7. The trunk lid cover in combination with a car spoiler of claim 1 wherein a message display is disposed within the rectangular-like sleeve section of the trunk lid cover.

8. A trunk lid cover in combination with a car spoiler comprising:
    a trunk lid cover of flexible material disposed for covering the trunk lid only of an automobile;
    attachment means for holding the trunk lid cover tightly against the surface of said trunk lid;
    a car spoiler attached to the trunk lid cover;
    wherein a message display is mounted to the trunk lid cover; and
    wherein the message display is a scrolling LED message display.

9. The trunk lid cover in combination with a car spoiler of claim 8 wherein a message display is removably mounted to the outward facing side of trunk lid cover.

10. The trunk lid cover in combination with a car spoiler of claim 8 wherein the message display is powered by power sources from the group including replaceable batteries, solar power and the automobile electrical system.

11. The trunk lid cover in combination with a car spoiler of claim 8 wherein the message display is removably mounted to the car spoiler.

12. The trunk lid cover in combination with a car spoiler of claim 8 wherein the display has an array of light emitting diodes (LEDs) for displaying a message.

13. The trunk lid cover in combination with a car spoiler of claim 12 wherein the message is scrolled across said display.

14. The trunk lid cover in combination with a car spoiler of claim 13 wherein said message is scrolled across said display a predetermined number of times.

15. The trunk lid cover in combination with a car spoiler of claim 13 wherein after the message has been displayed another message is automatically displayed.

16. A trunk lid cover in combination with a car spoiler comprising:
    a trunk lid cover of flexible material disposed for covering the trunk lid only of an automobile;
    attachment means for holding the trunk lid cover tightly against the surface of said trunk lid;
    a car spoiler attached to the trunk lid cover;
    wherein a message display is mounted to the trunk lid cover; and
    wherein the message display includes a keypad for generating a message corresponding to an operator selection and transferring said message to said display for output on said display.

17. The trunk lid cover in combination with a car spoiler of claim 16 wherein the keypad includes a plurality of keys, each of said keys corresponding to a message, said keypad selecting the corresponding message in response to depression of one of said keys.

18. The trunk lid cover in combination with a car spoiler of claim 16 wherein the car spoiler is removably attached to the trunk lid cover.

* * * * *